United States Patent
Oura et al.

(10) Patent No.: US 9,340,695 B2
(45) Date of Patent: May 17, 2016

(54) INK FOR INKJET TEXTILE PRINTING AND DYEING METHOD

(71) Applicant: Kiwa Chemical Industry Co., Ltd., Wakayama-shi, Wakayama (JP)

(72) Inventors: Tadashi Oura, Wakayama (JP); Hiroki Tanaka, Wakayama (JP)

(73) Assignee: Kiwa Chemical Industry Co., Ltd., Wakayama (JP)

( * ) Notice: Subject to any disclaimer, the term of this patent is extended or adjusted under 35 U.S.C. 154(b) by 0 days.

(21) Appl. No.: 14/398,354

(22) PCT Filed: Feb. 7, 2014

(86) PCT No.: PCT/JP2014/052923
§ 371 (c)(1),
(2) Date: Oct. 31, 2014

(87) PCT Pub. No.: WO2014/129323
PCT Pub. Date: Aug. 28, 2014

(65) Prior Publication Data
US 2015/0116419 A1   Apr. 30, 2015

(30) Foreign Application Priority Data

Feb. 21, 2013 (JP) ................................. 2013-032054

(51) Int. Cl.

| | |
|---|---|
| B41J 2/015 | (2006.01) |
| C09D 11/38 | (2014.01) |
| D06P 3/36 | (2006.01) |
| D06P 1/16 | (2006.01) |
| D06P 5/30 | (2006.01) |
| C08K 5/053 | (2006.01) |
| C09D 125/08 | (2006.01) |
| C09D 11/10 | (2014.01) |
| C09D 11/328 | (2014.01) |

(52) U.S. Cl.
CPC ................ *C09D 11/38* (2013.01); *C08K 5/053* (2013.01); *C09D 11/10* (2013.01); *C09D 11/328* (2013.01); *C09D 125/08* (2013.01); *D06P 1/16* (2013.01); *D06P 3/36* (2013.01); *D06P 5/30* (2013.01)

(58) Field of Classification Search
CPC ...... B41J 2/1623; B41J 2/1631; B41J 2/1628; B41J 2/14024; B41J 2/1603
USPC .......................................................... 347/20
See application file for complete search history.

(56) References Cited

U.S. PATENT DOCUMENTS

| | | | |
|---|---|---|---|
| 6,419,733 B1 | 7/2002 | Sano et al. | |
| 6,890,378 B2* | 5/2005 | Yatake ................... | C09D 11/40 106/31.58 |
| 2002/0009547 A1 | 1/2002 | Ito et al. | |
| 2004/0196343 A1 | 10/2004 | Maekawa et al. | |
| 2005/0231573 A1* | 10/2005 | Bruinsma ............... | C09D 11/30 347/96 |
| 2006/0203056 A1* | 9/2006 | Furukawa ............... | B41J 2/2114 347/96 |
| 2007/0283845 A1* | 12/2007 | Mizusaki ................ | C09D 11/38 106/31.58 |
| 2008/0028981 A1 | 2/2008 | Mizushima et al. | |
| 2009/0113641 A1* | 5/2009 | Akatani ................ | C09D 11/328 8/552 |
| 2009/0169765 A1* | 7/2009 | Nakamura ............. | C09D 11/01 427/511 |

FOREIGN PATENT DOCUMENTS

| | | |
|---|---|---|
| CN | 101016428 | 8/2007 |
| JP | 2000-095990 | 4/2000 |
| JP | 2001-294789 | 10/2001 |
| JP | 2002-201428 | 7/2002 |
| JP | 2003-246954 | 9/2003 |
| JP | 2006-160950 | 6/2006 |
| JP | 2008-291079 | 12/2008 |

(Continued)

OTHER PUBLICATIONS

Chinese Office Action, May 11, 2015; Chinese Patent Application No. 201480001144.7 (8 pages).
English machine translation for JP 2006-160950, which corresponds to TW 200632050 (supplement to the reference and English abstract submitted on Oct. 31, 2014—16 pages).

(Continued)

*Primary Examiner* — Manish S Shah
*Assistant Examiner* — Yaovi Ameh
(74) *Attorney, Agent, or Firm* — Hamre, Schumann, Mueller & Larson, P.C.

(57) ABSTRACT

Ink for inkjet textile printing of the present invention contains water, a disperse dye, a water-soluble organic solvent and an anionic high-molecular dispersant. The water-soluble organic solvent is a polyhydric alcohol such as glycerin. The water-soluble organic solvent is contained in an amount of 25 to 50 mass % with respect to the total mass of the ink. The anionic high-molecular dispersant is a styrene-(meth)acrylic acid-based copolymer having an acid value of 160 to 250 mg KOH/g and a weight-average molecular weight of 8,000 to 20,000. The ink for inkjet textile printing further contains an acetylene glycol-based compound expressed by the following Chemical Formula (I) as a penetrant. With this ink for inkjet textile printing, provided is disperse dye-containing ink for inkjet textile printing that has a high-quality and stable recording performance and achieves a high print density on the surface of a fabric while maintaining an ink storage stability, and an inkjet textile printing method using the ink for inkjet textile printing.

[Chemical Formula 1]

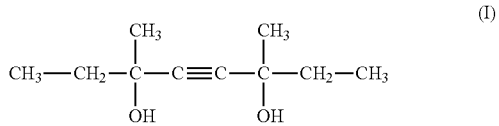

(I)

15 Claims, No Drawings

(56) References Cited

FOREIGN PATENT DOCUMENTS

| | | |
|---|---|---|
| JP | 2011-174007 | 9/2011 |
| WO | WO 99/05230 | 2/1999 |
| WO | WO 2006/061995 | 6/2006 |

OTHER PUBLICATIONS

Office Action issued in corresponding Chinese Application No. 20148001144.7, Dec. 23, 2015, 5 pages with a partial English translation.

* cited by examiner

INK FOR INKJET TEXTILE PRINTING AND DYEING METHOD

TECHNICAL FIELD

The present invention relates to ink for inkjet textile printing in inkjet recording systems and an inkjet textile printing method using the same.

BACKGROUND ART

Aqueous ink for inkjet recording generally is used in the form of a solution obtained by dissolving a water-soluble dye in water or an aqueous solution containing a water-soluble organic solvent, or in the form of a dispersion obtained by dispersing a water-insoluble color material into water or an aqueous solution containing a water-soluble organic solvent. The ink for inkjet textile printing using a disperse dye is used for a method, for example, in which a fabric made of a hydrophobic fiber material is subjected to inkjet printing and is then heated to be dyed. Examples of the characteristics required for ink for inkjet recording include the following:
(1) ejection stability while preventing nozzle clogging;
(2) high-quality recorded images resulting from uniformity in the direction, the ejection amount, and the dot shape of ink ejected;
(3) ink storage stability;
(4) high print density and high image quality; and
(5) quick drying and fixation.

In an inkjet recording system, it is required to eject ink from thin nozzles as ink droplets, and therefore, item (1) of the above-described items is particularly important. In particular, in an on-demand type inkjet recording system, there is a problem in that the ejection of ink from the nozzles is temporarily stopped even during a continuous operation, and thus an ejection failure occurs during long continuous operation. Unlike ink for inkjet textile printing using a water-soluble dye, ink for inkjet textile printing in the form of a dispersion using a disperse dye is likely to cause clogging because precipitates (aggregates) are generated due to the degradation of dispersibility and the viscosity increases due to the evaporation of moisture in the nozzles, for example. In particular, when the device is not operated for a long time, clogging is likely to occur due to the evaporation of moisture. Therefore, a humectant is added to suppress the evaporation of moisture. Examples of the humectant include a high-boiling water-soluble organic solvent and a solid water-soluble compound. Polyhydric alcohol-based compounds such as glycerin and polyethylene glycol, pyrrolidone-based compounds such as 2-pyrrolidone and N-methyl-2-pyrrolidone, and the like are used as the high-boiling water-soluble organic solvent, and sugars, urea-based compounds and the like are used as the solid water-soluble compound.

Patent Document 1 describes ink for inkjet recording characterized by containing a water-insoluble color material, a dispersant, and a polyoxyethylene alkyl ether-based compound with an alkyl group having 25 to 150 carbon atoms. Since the dispersant and the polyoxyethylene alkyl ether-based compound with an alkyl group having 25 to 150 carbon atoms are mixed together in the ink for inkjet recording described in Patent Document 1 in order to improve a redispersion property, the surface tension of the ink tends to be low. Therefore, when inkjet printing using that ink is performed on a fabric made of a hydrophobic fiber material, the ink sometimes exhibits excessive penetration into the fabric, and thus the density of the ink on the surface of the fabric tends to be low.

Patent Document 2 describes an aqueous ink composition in which a water-insoluble coloring agent has an average dispersed particle size of 0.1 to 0.3 µm, a styrene-acrylic acid-based copolymer has an acid value of no less than 150 mg KOH/g to less than 250 mg KOH/g as a free acid, and a proportion of the styrene-acrylic acid-based copolymer with respect to the water-insoluble coloring agent is no less than 5 mass % to less than 20 mass %. Patent Document 2 states that the water-insoluble coloring agent has an average dispersed particle size within a specific range of 0.1 to 0.3 µm, which is relatively large, and thus it is possible to achieve an extremely high recording density. However, since the proportion of the styrene-acrylic acid-based copolymer with respect to the water-insoluble coloring agent is no less than 5 mass % to less than 20 mass %, a sufficient dispersion stability (ink storage stability) of the water-insoluble coloring agent is not attained.

Patent Document 3 describes an ink composition containing an acetylene glycol compound as a penetrant and a styrene-(meth)acrylic acid-based water-soluble resin as a water-soluble dispersant in ink containing a specific pigment. Patent Document 3 states that the ink composition containing a specific pigment together with specific components achieves images having an excellent rubbing resistance and color reproducibility, and has advantages as an extremely permeable ink composition. The styrene-(meth)acrylic acid-based water-soluble resin described in each of the examples in Patent Document 3 has a weight-average molecular weight of only 7,000 and an acid value of 70 to 150, and the acetylene glycol compound is unspecified. In the examples, only "Surfynol 465" is described as the acetylene glycol compound.

Patent Document 4 describes disperse dye-containing inkjet ink that contains a polymer resin having a carboxyl group or a sulfonic group as an acidic group with an acid value of no less than 80 mg KOH/g to no more than 300 mg KOH/g in an amount of no less than 2 mass % to no more than 10 mass % as a solid content, the polymer resin being used not as a dispersant but as a binder resin, the inkjet ink being capable of achieving high-quality and highly durable images only by heating a fabric.

PRIOR ART DOCUMENTS

Patent Document

[Patent Document 1] JP 2003-246954A
[Patent Document 2] JP 2001-294789A
[Patent Document 3] WO 1999/005230
[Patent Document 4] JP 2008-291079A

DISCLOSURE OF INVENTION

Problem to be Solved by the Invention

As described above, with a conventional technique, it has been difficult to achieve a high print density on the surface of a recording medium while maintaining a high-quality and stable recording performance and an ink storage stability.

The present invention provides disperse dye-containing ink for inkjet textile printing that solves the foregoing problems of conventional ink for inkjet textile printing using a disperse dye, has a high-quality and stable recording performance, and can achieve a high print density on the surface of a fabric while maintaining an ink storage stability, and an inkjet textile printing method using the ink for inkjet textile printing.

Means for Solving Problem

The ink for inkjet textile printing of the present invention is ink for inkjet textile printing containing water, a disperse dye, a water-soluble organic solvent and an anionic high-molecular dispersant, wherein the water-soluble organic solvent is at least one selected from glycerin, diethylene glycol, triethylene glycol, polyethylene glycol (average molecular weight of 200 to 600), dipropylene glycol and tripropylene glycol, the water-soluble organic solvent is contained in an amount of 25 to 50 mass % with respect to a total mass of the ink, the anionic high-molecular dispersant is a styrene-(meth)acrylic acid-based copolymer having an acid value of 160 to 250 mg KOH/g and a weight-average molecular weight of 8,000 to 20,000, and the ink for inkjet textile printing further contains an acetylene glycol-based compound expressed by the following Chemical Formula (I) as a penetrant.

[Chemical Formula 1]

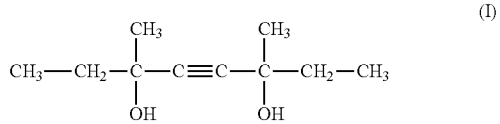

The inkjet textile printing method of the present invention is characterized by performing inkjet printing using the ink for inkjet textile printing of the present invention on a fabric made of a hydrophobic fiber material and then heating the fabric.

Effects of the Invention

With the present invention, it is possible to provide disperse dye-containing ink for inkjet textile printing that has a prerequisite high-quality and stable recording performance and can achieve a high print density on the surface of a fabric while maintaining an ink storage stability. In addition, with a dyeing method using the ink for inkjet textile printing of the present invention, it is possible to provide an inkjet textile printing method that can achieve a high dyeing density on the surface of an object to be dyed.

DESCRIPTION OF THE INVENTION

As a result of researching a dispersant and a penetrant in a disperse dye in order to provide an ink composition that can achieve a high print density on the surface of a fabric in ink for inkjet textile printing that has an excellent reliability and is not likely to cause nozzle clogging in an inkjet head, the inventors of the present invention found that the above-described purpose can be achieved by selecting a specific anionic high-molecular dispersant and a specific penetrant, and the present invention was achieved.

The anionic high-molecular dispersant used in the present invention is a styrene-(meth)acrylic acid-based copolymer having an acid value of 160 to 250 mg KOH/g and a weight-average molecular weight of 8,000 to 20,000. The present invention is characterized in that the anionic high-molecular dispersant is used as a dispersant for a disperse dye. The anionic high-molecular dispersant is used to pulverize the disperse dye and disperse it in an aqueous medium, and also performs the function of maintaining a dispersion stability of the pulverized disperse dye.

Examples of the styrene-(meth)acrylic acid-based copolymer include a styrene-acrylic acid copolymer, styrene-methacrylic acid copolymer, styrene-acrylic acid-acrylic acid ester copolymer, styrene-methacrylic acid-acrylic acid ester copolymer, styrene-α-methylstyrene-acrylic acid copolymer, and styrene-α-methylstyrene-methacrylic acid copolymer.

The styrene-(meth)acrylic acid-based copolymer used in the present invention has an acid value of 160 to 250, and preferably within a range of 200 to 250. It is not preferable that the acid value is less than 160 because the resin becomes less soluble in water and tends to have a low dispersion-stabilizing ability for the disperse dye, and it is also not preferable that the acid value is greater than 250 because the affinity to the aqueous medium is enhanced and a blur tends to easily occur in printed images. An acid value of a resin represents the amount of KOH in mg required to neutralize 1 g of the resin, and is measured in accordance with JIS-K3054.

Moreover, the styrene-(meth)acrylic acid-based copolymer has a weight-average molecular weight of 8,000 to 20,000, and preferably 10,000 to 18,000. It is not preferable that the weight-average molecular weight is less than 8,000 because the dispersion-stabilizing ability for the disperse dye is lowered, and it is also not preferable that the weight-average molecular weight is more than 20,000 because the ability to disperse the disperse dye is lowered and the viscosity of the ink sometimes becomes too high. The weight-average molecular weight of the styrene-(meth)acrylic acid-based copolymer is measured by gel permeation chromatography (GPC).

The styrene-(meth)acrylic acid-based copolymer in the form of flakes or of an aqueous solution is commercially available and that in the form of an aqueous solution is preferably used from the viewpoint of handling. Specific examples thereof include "Joncryl 60" (weight-average molecular weight of 8,500 and acid value of 215), "Joncryl 62" (weight-average molecular weight of 8,500 and acid value of 200), "Joncryl 63" (weight-average molecular weight of 12,500 and acid value of 213), "Joncryl 70" (weight-average molecular weight of 16,500 and acid value of 240), "HPD-71" (weight-average molecular weight of 17,250 and acid value of 214), and "HPD-96" (weight-average molecular weight of 16,500 and acid value of 240), manufactured by BASF Japan Ltd.

These anionic high-molecular dispersants are preferably contained in an amount of 0.2 to 4 mass % with respect to the total mass of the ink in order to favorably maintain the dispersion stability of the disperse dye. Also, these anionic high-molecular dispersants are preferably contained in an amount of 20 to 40 mass %, and more preferably 20 to 30 mass %, with respect to the disperse dye, in order to favorably maintain the dispersion stability of a sublimation dye.

The present invention is also characterized in that an acetylene glycol-based compound expressed by the above-described Chemical Formula (I) is contained as a penetrant. The compound expressed by the above-described Chemical Formula (I) is named 3,6-dimethyl-4-octyne-3,6-diol, and is commercially available as "Surfynol 82" from Nissin Chemical Industry Co., Ltd.

Generally, examples of an acetylene glycol-based compound include 2,5-dimethyl-3-hexyne-2,5-diol, 4,7-dimethyl-5-decyne-4,7-diol, 2,4,7,9-tetramethyl-5-decyne-4,7-diol and 3,6-dimethyl-4-octyne-3,6-diol, and the 2,5-dimethyl-3-hexyne-2,5-diol, the 4,7-dimethyl-5-decyne-4,7-diol, the 2,4,7,9-tetramethyl-5-decyne-4,7-diol and the 3,6-dimethyl-4-octyne-3,6-diol to which an ethyleneoxy group and/or a propyleneoxy group is added. These compounds are commercially available as "Surfynol 82", 104, 420, 440, 465, 485 (manufactured by Nissin Chemical Industry Co., Ltd.) and so on, and 3,6-dimethyl-4-octyne-3,6-diol ("Surfynol 82"), which is the compound expressed by Chemical Formula (I), is used for the disperse dye ink of the present invention.

By selecting the above-described anionic high-molecular dispersant as a dispersant for the disperse dye and the compound expressed by Chemical Formula (I) as a penetrant, it is possible to obtain an ink composition that can achieve a high print density on the surface of a fabric made of a hydrophobic fiber material.

In this case, when a combination of the above-described anionic high-molecular dispersant and the other acetylene glycol-based compounds is used, the ink composition has a high permeability, and therefore, it is impossible to achieve a high print density on the surface of a fabric. It is conceivable that since the compound expressed by Chemical Formula (I) exhibits a moderate permeating effect compared with the other acetylene glycol-based compounds, the permeability of the ink into a fabric is also moderate and the disperse dye stays near the surface, and thus a high print density on the surface of a fabric is achieved.

Moreover, when the other acetylene glycol-based compounds are used, an ink storage stability is deteriorated, but when the compound expressed by Chemical Formula (I) is used, the ink storage stability is favorable.

The compound expressed by Chemical Formula (I) is preferably contained in an amount of 0.1 to 2.0 mass %, more preferably 0.1 to 1.5 mass %, and even more preferably 0.2 to 1.0 mass %, with respect to the total mass of the ink from the viewpoint of maintaining the solubility into the ink and the moderate permeability to a fabric.

Examples of the disperse dye used in the present invention include an azo dye, an anthraquinone dye, a quinophthalone dye, a styryl dye, an oxazine dye, a xanthene dye, a methine dye, and an azomethine dye. Of such dyes, examples of a yellow disperse dye include "C.I.Disperse Yellow 42", 51, 54, 60, 64, 65, 71, 82, 98, 114, 119, 149, 160, 163, 201, and 211. Examples of an orange disperse dye include "C.I.Disperse Orange 25", 29, 30, 31, 32, 33, 44, 61, 62, 73, 155, and 288. Examples of a red disperse dye include "C.I.Disperse Red 4", 22, 50, 55, 59, 60, 73, 86, 91, 92, 145, 146, 152, 153, 167, 167:1, 177, 179, 191, 227, 258, 302, and 343. Examples of a blue disperse dye include "C.I.Disperse Blue 14", 27, 56, 60, 72, 73, 77, 79, 79:1, 148, 165, 165:1, 183:1, 214, 281, 284, 291, 291:1, 301, 334, 359, 360, 366, and 367. Examples of other disperse dyes include "C.I.Disperse Violet 26", 27, 28, 57, and 93. Examples of types of dyes other than the above-described dyes include "C.I. Solvent Yellow 160" and 163, and "C.I.Vat Red 41".

Of these dyes, it is preferable to use "C.I.Disperse Yellow 42", 51, 65, 98, 114, 119, 149, 160, 163, 201, and 211; "C.I.Disperse Orange 29", 30, 31, 32, 33, 44, 61, 62, 73, and 155; "C.I.Disperse Red 50", 59, 73, 86, 91, 92, 145, 152, 153, 167, 167:1, 177, 179, 191, 227, 258, and 343; "C.I.Disperse Blue 27", 60, 73, 77, 79, 79:1, 148, 165, 165:1, 183:1, 214, 281, 284, 291, 291:1, 301, 366, and 367; "C.I.Disperse Violet 26", 27, 57, and 93; "C.I.Solvent Yellow 160" and 163; and "C.I.Vat Red 41".

Generally, these disperse dyes preferably are contained in an amount of 0.2 to 12 mass %, and more preferably 0.5 to 10 mass %, with respect to the total mass of the ink because the dispersion stability can be maintained and the required print density can be achieved.

In the present invention, the anionic high-molecular dispersant used in the present invention pulverizes the disperse dye and disperses it in an aqueous medium, and also performs the function of maintaining a dispersion stability of the pulverized disperse dye.

Furthermore, an anionic surfactant, a nonionic surfactant, and the like can be used during the preparation of ink. In particular, the anionic surfactant preferably is contained in an amount of 0.1 to 3 mass % with respect to the total mass of the ink in order to further improve the dispersion stability of the disperse dye.

Examples of the anionic surfactant include a naphthalenesulfonate formalin condensate, lignin sulfonates, an aromatic sulfonate formalin condensate (e.g., a formalin condensate of sodium alkylnaphthalenesulfonate such as sodium butylnaphthalenesulfonate and sodium naphthalenesulfonate, a formalin condensate of sodium cresol sulfonate and sodium 2-naphthol-6-sulfonate, a sodium cresol sulfonate formalin condensate, and a sodium creosote oil sulfonate formalin condensate), and a polyoxyethylene alkyl ether sulfate. Of these surfactants, it is preferable to use the naphthalenesulfonate formalin condensate and the aromatic sulfonate formalin condensate.

Examples of the water-soluble organic solvent that can be used in the present invention include glycerin, diglycerin, polyglycerin, ethylene glycol, diethylene glycol, triethylene glycol, polyethylene glycol, propylene glycol, 1,3-propanediol, dipropylene glycol, tripropylene glycol, polypropylene glycol, 2-pyrrolidone, N-methylpyrrolidone, dimethyl sulfoxide, and sulfolane.

Of the water-soluble organic solvents, it is preferable to use glycerin, diethylene glycol, triethylene glycol, polyethylene glycol (average molecular weight of 200 to 600), dipropylene glycol, and tripropylene glycol, and more preferably glycerin, diethylene glycol, and dipropylene glycol, from the viewpoint of moisturizing properties. Of these solvents, glycerin is particularly preferable. These solvents may be used alone or in combination of two or more.

These water-soluble organic solvents preferably are contained in an amount of 25 to 50 mass %, more preferably 30 to 45 mass %, and particularly preferably 30 to 40 mass %, with respect to the total mass of the ink, from the viewpoint of the viscosity adjustment of the ink and the prevention of clogging by the moisturizing effect.

It is possible to add other various additives to the ink of the present invention as needed as long as the object of the present invention is not prevented from being achieved. Examples of the additives include a surface tension regulating agent, a hydrotropic agent, a pH adjusting agent, a viscosity adjusting agent, a preservative agent, an antimold agent, a corrosion inhibitor, an oxidation inhibitor, a reduction inhibitor, a photostabilizer, a chelating agent, and an antifoaming agent.

An organic amine, an alkali metal hydroxide, and the like can be used as the pH adjusting agent. Moreover, acetylene glycol-based compounds (e.g., product name "Surfynol 104E" manufactured by Nissin Chemical Industry Co., Ltd.) other than the compound expressed by Chemical Formula (I) can be used as the antifoaming agent, and preferably are contained in an amount of 0.01 to 0.1 mass % because use of too much lowers the print density.

Although there is no particular limitation on the method for preparing the ink for inkjet textile printing of the present invention, the ink is preferably prepared by the following method.

(1) The disperse dye, the styrene-(meth)acrylic acid-based copolymer, water, and, as needed, the water-soluble organic solvent and the above-described additive are mixed and stirred, and thus a primary dispersion is adjusted.

(2) Next, the disperse dye in the primary dispersion is pulverized and dispersed by a wet medium mill such as a sand mill, and thus a disperse dye dispersion is obtained.

(3) Water, the compound expressed by Chemical Formula (I), and, as needed, the water-soluble organic solvent and the above-described additive, are added to the disperse dye dispersion to adjust the concentration, and then, the solution is used as ink for inkjet textile printing after being filtered using a filter paper or the like.

In the above-described method, the styrene-(meth)acrylic acid-based copolymer further may be added thereto during the concentration adjustment in order to improve the dispersion property of the disperse dye. The average particle diameter of the disperse dye obtained by the above-described method is preferably 200 nm or less, and more preferably 50 to 150 nm.

While the specific examples of the disperse dye, the water-soluble organic solvent, the styrene-(meth)acrylic acid-based copolymer, the compound expressed by Chemical Formula (I), and the other components have been described above, the present invention is not limited to only the specific examples.

A method for performing inkjet textile printing using the ink for inkjet textile printing of the present invention as described above can be performed as follows, for example. First, the ink for inkjet textile printing is set in a piezo-type inkjet printer and then can be ejected on a polyester fabric on which a pre-treatment such as a treatment for preventing a blur has been performed to form a desired image. Furthermore, this fabric is heated, for example, at 150 to 220° C. for 1 to 15 minutes, and thus polyester fibers are dyed with the disperse dye. Thereafter, by removing the non-fixed disperse dye, the additive such as a dispersant, the pre-treatment agent, and the like by reduction cleaning and washing with water and by drying the fabric, a dyed product on which that image is printed can be provided.

EXAMPLES

Hereinafter, the present invention will be described more specifically by way of examples, but the present invention is not limited to the following examples. It should be noted that in the examples below, the term "parts" refers to "parts by mass" and the term "%" refers to "mass %" unless otherwise stated.

Working Example 1

A mixture including 100 parts of a red disperse dye dry cake (C.I.Disperse Red 92), 100 parts of "Joncryl 63" (30% aqueous solution of resin of ammonia neutralized styrene-(meth)acrylic acid-based copolymer having a weight-average molecular weight of 12,500 and an acid value of 213) as an anionic high-molecular dispersant, and 300 parts of water was prepared. The mixture was pulverized for 35 hours in a sand mill using 1,500 parts of zircon beads with a diameter of 0.4 mm to provide a dispersion.

To 40 parts of this dispersion, 35 parts of glycerin, 1 part of "Surfynol 82" (manufactured by Nissin Chemical Industry Co., Ltd.), which is an acetylene glycol-based compound expressed by Chemical Formula (I), and 24 parts of water were added, and thus ink in which the dye concentration was adjusted to 8% was produced. The average particle diameter of the dye was 100 nm.

Working Examples 2 to 4

Inks of Working Examples 2 to 4 were produced by adjusting the dye concentrations to 8% in the same manner as in Working Example 1, except that the amount of "Surfynol 82" was changed to 0.2 parts, 1.5 parts, and 1.8 parts. The average particle diameter of the dye was 100 nm.

Working Example 5

A dispersion was obtained by performing the pulverization in the same manner as in Working Example 1, except that 100 parts of a yellow disperse dye dry cake (C.I.Disperse Yellow 65) was used instead of the red disperse dye dry cake. To 20 parts of this dispersion, 35 parts of glycerin, 1 part of "Surfynol 82", and 44 parts of water were added, and thus ink in which the dye concentration was adjusted to 4% was produced. The average particle diameter of the dye was 90 nm.

Working Example 6

A dispersion was obtained by performing the pulverization in the same manner as in Working Example 1, except that 100 parts of a blue disperse dye dry cake (C.I.Disperse Blue 60) was used instead of the red disperse dye dry cake. To 40 parts of this dispersion, 35 parts of glycerin, 1 part of "Surfynol 82", and 24 parts of water were added, and thus ink in which the dye concentration was adjusted to 8% was produced. The average particle diameter of the dye was 110 nm.

Working Example 7

A dispersion was obtained by performing the pulverization in the same manner as in Working Example 1, except that 100 parts of a blue disperse dye dry cake (C.I.Disperse Blue 165) was used instead of the red disperse dye dry cake. To 20 parts of this dispersion, 35 parts of glycerin, 1 part of "Surfynol 82", and 44 parts of water were added, and thus ink in which the dye concentration was adjusted to 4% was produced. The average particle diameter of the dye was 90 nm.

Working Example 8

Ink in which the dye concentration was adjusted to 8% was produced in the same manner as in Working Example 1, except that the pulverization was performed using 67 parts of "Joncryl 63" and 333 parts of water. The average particle diameter of the dye was 100 nm.

Working Example 9

To 10 parts of a dispersion produced by the same method as Working Example 1, 35 parts of glycerin, 1 part of "Surfynol 82", and 54 parts of water were added, and thus ink in which the dye concentration was adjusted to 2% was produced. The average particle diameter of the dye was 100 nm.

Working Example 10

A mixture including 100 parts of a red disperse dye dry cake (C.I.Disperse Red 92), 133 parts of "Joncryl 63", and 267 parts of water was prepared. The mixture was pulverized for 35 hours in a sand mill using 1,500 parts of zircon beads with a diameter of 0.4 mm to provide a dispersion. To 50 parts of this dispersion, 35 parts of glycerin, 1 part of "Surfynol 82", and 14 parts of water were added, and thus ink in which the dye concentration was adjusted to 10% was produced. The average particle diameter of the dye was 100 nm.

Working Example 11

A dispersion was obtained by performing the pulverization in the same manner as in Working Example 1, except that 98 parts of "Joncryl 61" (30.5% aqueous solution of resin of ammonia neutralized styrene-(meth)acrylic acid-based copolymer having a weight-average molecular weight of 12,000 and an acid value of 195) as an anionic high-molecular dispersant and 302 parts of water were used. To 40 parts of this dispersion, 35 parts of glycerin, 1 part of "Surfynol 82", and 24 parts of water were added, and thus ink in which the dye concentration was adjusted to 8% was produced. The average particle diameter of the dye was 100 nm.

Working Example 12

A dispersion was obtained by performing the pulverization in the same manner as in Working Example 1, except that 100 parts of "Joncryl 70" (30% aqueous solution of resin of ammonia neutralized styrene-(meth)acrylic acid-based copolymer having a weight-average molecular weight of 16,500 and an acid value of 240) as an anionic high-molecular dispersant was used. To 40 parts of this dispersion, 35 parts of glycerin, 1 part of "Surfynol 82", and 24 parts of water were added, and thus ink in which the dye concentration was adjusted to 8% was produced. The average particle diameter of the dye was 100 nm.

Working Example 13

To 40 parts of a dispersion produced by the same method as Working Example 1, 35 parts of glycerin, 1 part of "Surfynol 82", 1.5 parts of "Demol N" (β-naphthalenesulfonate formalin condensate sodium salt, manufactured by Kao Corporation) as an anionic surfactant, and 22.5 parts of water were added, and thus ink in which the dye concentration was adjusted to 8% was produced. The average particle diameter of the dye was 100 nm.

Working Example 14

To 40 parts of a dispersion produced by the same method as Working Example 1, 35 parts of glycerin, 1 part of "Surfynol 82", 1.5 parts of "Demol SNB" (sodium aromatic sulfonate formalin condensate, manufactured by Kao Corporation) as an anionic surfactant, and 22.5 parts of water were added, and thus ink in which the dye concentration was adjusted to 8% was produced. The average particle diameter of the dye was 100 nm.

Working Example 15

To 40 parts of a dispersion produced by the same method as Working Example 1, 25 parts of glycerin, 1 part of "Surfynol 82", and 34 parts of water were added, and thus ink in which the dye concentration was adjusted to 8% was produced. The average particle diameter of the dye was 100 nm.

Working Example 16

To 40 parts of a dispersion produced by the same method as Working Example 1, 50 parts of glycerin, 1 part of "Surfynol 82", and 9 parts of water were added, and thus ink in which the dye concentration was adjusted to 8% was produced. The average particle diameter of the dye was 100 nm.

Reference Examples 1 to 3

Working Examples 17 to 22

To 40 parts of a dispersion produced by the same method as Working Example 1, 1 part of "Surfynol 82", 24 parts of water, and a predetermined amount of glycerin, diglycerin, ethylene glycol, propylene glycol, diethylene glycol, polyethylene glycol (average molecular weight of 300), or dipropylene glycol shown in Table 2 were added, and thus ink in which the dye concentration was adjusted to 8% was produced. The average particle diameter of the dye was 100 nm. It should be noted that Reference Examples 1 to 3 are disclosed as technical information.

Comparative Examples 1 to 5

Inks of Comparative Examples 1 to 5 were produced in the same manner as in Working Example 1, except that "Surfynol 82" in Working Example 1 was changed to "Surfynol 104E" (acetylene glycol-based compound, manufactured by Nissin Chemical Industry Co., Ltd.), "Surfynol 465" ("Surfynol 104" to which ethylene oxide has been added, manufactured by Nissin Chemical Industry Co., Ltd.), "BYK-348" (silicone-based surfactant, manufactured by BYK-Chemie Japan), diethylene glycol monobutyl ether, and 1,2-hexanediol. The average particle diameter of the dye of each comparative example was 100 nm.

Comparative Example 6

A mixture including 100 parts of a red disperse dye dry cake (C.I.Disperse Red 92), 81 parts of "Joncryl 57" (37% aqueous solution of resin of ammonia neutralized styrene-(meth)acrylic acid-based copolymer having a weight-average molecular weight of 4,900 and an acid value of 215) as an anionic high-molecular dispersant, and 319 parts of water was prepared. The mixture was pulverized for 35 hours in a sand mill using 1,500 parts of zircon beads with a diameter of 0.4 mm to provide a dispersion. To 40 parts of this dispersion, 35 parts of glycerin, 1 part of "Surfynol 82", and 24 parts of water were added, and thus ink in which the dye concentration was adjusted to 8% was produced. The average particle diameter of the dye was 120 nm.

Comparative Example 7

A mixture including 100 parts of a red disperse dye dry cake (C.I.Disperse Red 92), 100 parts of "Demol N" as a dispersant, and 300 parts of water was prepared. The mixture was pulverized for 35 hours in a sand mill using 1,500 parts of zircon beads with a diameter of 0.4 mm to provide a dispersion. To 40 parts of this dispersion, 35 parts of glycerin, 1 part of "Surfynol 82", and 24 parts of water were added, and thus ink in which the dye concentration was adjusted to 8% was produced. The average particle diameter of the dye was 120 nm.

Comparative Example 8

A mixture including 100 parts of a red disperse dye dry cake (C.I.Disperse Red 92), 70 parts of "Demol N" as a dispersant, 30 parts of "Unithox 480" (linear alcohol having an average carbon number of 30 to which ethylene oxide has been added, manufactured by Petrolite Corporation, USA), and 300 parts of water was prepared. The mixture was pulverized for 35 hours in a sand mill using 1,500 parts of zircon beads with a diameter of 0.4 mm to provide a dispersion. To 40 parts of this dispersion, 35 parts of glycerin, 1 part of "Surfynol 82", and 24 parts of water were added, and thus ink in which the dye concentration was adjusted to 8% was produced. The average particle diameter of the dye was 100 nm.

Moreover, the following tests were conducted on each of the inks produced in the above-described working examples and comparative examples.

(1) Ejection Test

Using each of the inks produced in the above-described working examples and comparative examples in a commercially available large-format inkjet plotter ("JV4-130" manufactured by Mimaki Engineering, Co., Ltd.), solid printing with a single color was performed for 10 hours under the conditions of 360×540 dpi, 3 passes, bidirectional printing, and 1,200 mm print width. After the printing, nozzles were checked and the number of nozzles that did not eject ink properly, of 180 nozzles in total, was confirmed.

Evaluations:

A The number of nozzles that do not eject ink properly is 0 to 2.

B The number of nozzles that do not eject ink properly is 3 to 9.

C The number of nozzles that do not eject ink properly is 10 or more.

(2) Textile Printing-Dyeing Test (Density Feeling)

Using each of the inks produced in the above-described working examples and comparative examples in a large-format inkjet plotter ("TX2-160" (piezo type), manufactured by Mimaki Engineering, Co., Ltd.), solid printing with a single color was performed in a region with a length of 300 mm and a width of 400 mm on a commercially available polyester fabric pre-treated for inkjet printing ("Dairiki Super Pongee", manufactured by Dairiki) under the conditions of 360×540 dpi, 3 passes, and bidirectional printing. Then, the fabric was heated at 175° C. for 8 minutes using an H. T. steamer to be dyed. Then, the fabric was subjected to reduction cleaning and washing with water to provide a dyed fabric. Density feeling of the obtained dyed fabric was confirmed visually.

Evaluations:

A The dyeing density of the dyed fabric is high.

B The dyeing density of the dyed fabric is slightly low.

C The dyeing density of the dyed fabric is considerably low.

(3) Temporal Stability Confirmation Test

The inks for sublimation transfer inkjet recording produced in the working examples and comparative examples were stored at 40° C. for 1 month, and then the generated aggregates (precipitates) was confirmed visually.

Evaluations:

A No aggregates are generated.

B A small number of aggregates are generated.

C A large number of aggregates are generated.

Tables 1 to 3 show the test results. Numerical values for each substance in Tables 1 to 3 are expressed in parts by mass.

TABLE 1

| Work. Ex. No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| C.I. Disperse Yellow-65 | | | | | 4.0 | | | | | | | | | | | |
| C.I. Disperse Red-92 | 8.0 | 8.0 | 8.0 | 8.0 | | | | 8.0 | 2.0 | 10.0 | 8.0 | 8.0 | 8.0 | 8.0 | 8.0 | 8.0 |
| C.I. Disperse Blue-60 | | | | | | 8.0 | | | | | | | | | | |
| C.I. Disperse Blue-165 | | | | | | | 4.0 | | | | | | | | | |
| Surfynol 82 | 1.0 | 0.2 | 1.5 | 1.8 | 1.0 | 1.0 | 1.0 | 1.0 | 1.0 | 1.0 | 1.0 | 1.0 | 1.0 | 1.0 | 1.0 | 1.0 |
| Surfynol 104E | | | | | | | | | | | | | | | | |
| Surfynol 465 | | | | | | | | | | | | | | | | |
| BYK-348 | | | | | | | | | | | | | | | | |
| Diethylene glycol monobutyl ether | | | | | | | | | | | | | | | | |
| 1,2-Hexanediol | | | | | | | | | | | | | | | | |
| Joncryl 63 (solid content) | 2.4 | 2.4 | 2.4 | 2.4 | 1.2 | 2.4 | 1.2 | 1.6 | 0.4 | 4.0 | | | 2.4 | 2.4 | 2.4 | 2.4 |
| Joncryl 61 (solid content) | | | | | | | | | | | 2.4 | | | | | |
| Joncryl 70 (solid content) | | | | | | | | | | | | 2.4 | | | | |
| Joncryl 57 (solid content) | | | | | | | | | | | | | | | | |
| Demol N | | | | | | | | | | | | | 1.5 | | | |
| Demol SNB | | | | | | | | | | | | | | 1.5 | | |
| Unithox 480 | | | | | | | | | | | | | | | | |
| Glycerin | 35.0 | 35.0 | 35.0 | 35.0 | 35.0 | 35.0 | 35.0 | 35.0 | 35.0 | 35.0 | 35.0 | 35.0 | 35.0 | 35.0 | 25.0 | 50.0 |
| Diglycerin | | | | | | | | | | | | | | | | |
| Ethylene glycol | | | | | | | | | | | | | | | | |
| Propylene glycol | | | | | | | | | | | | | | | | |
| Diethylene glycol | | | | | | | | | | | | | | | | |
| Polyethylene glycol (average molecular weight of 300) | | | | | | | | | | | | | | | | |
| Dipropylene glycol | | | | | | | | | | | | | | | | |
| Ejection performance | A | A | A | A | A | A | A | A | A | A | A | A | A | A | A | A |
| Density feeling (textile printing-dyeing) | A | A | A | A | A | A | A | A | A | A | A | A | A | A | A | A |
| Temporal ink stability | A | A | A | A | A | A | A | A | A | A | A | A | A | A | A | A |

TABLE 2

| Work. Ex. No. | Ref. Ex. 1 | Ref. Ex. 2 | Ref. Ex. 3 | 17 | 18 | 19 | 20 | 21 | 22 |
|---|---|---|---|---|---|---|---|---|---|
| C.I. Disperse Yellow-65 | | | | | | | | | |
| C.I. Disperse Red-92 | 8.0 | 8.0 | 8.0 | 8.0 | 8.0 | 8.0 | 8.0 | 8.0 | 8.0 |
| C.I. Disperse Blue-60 | | | | | | | | | |
| C.I. Disperse Blue-165 | | | | | | | | | |
| Surfynol 82 | 1.0 | 1.0 | 1.0 | 1.0 | 1.0 | 1.0 | 1.0 | 1.0 | 1.0 |
| Surfynol 104E | | | | | | | | | |
| Surfynol 465 | | | | | | | | | |
| BYK-348 | | | | | | | | | |
| Diethylene glycol monobutyl ether | | | | | | | | | |
| 1,2-Hexanediol | | | | | | | | | |

TABLE 2-continued

| Work. Ex. No. | Ref. Ex. 1 | Ref. Ex. 2 | Ref. Ex. 3 | 17 | 18 | 19 | 20 | 21 | 22 |
|---|---|---|---|---|---|---|---|---|---|
| Joncryl 63 (solid content) | 2.4 | 2.4 | 2.4 | 2.4 | 2.4 | 2.4 | 2.4 | 2.4 | 2.4 |
| Joncryl 61 (solid content) | | | | | | | | | |
| Joncryl 70 (solid content) | | | | | | | | | |
| Joncryl 57 (solid content) | | | | | | | | | |
| Demol N | | | | | | | | | |
| Demol SNB | | | | | | | | | |
| Unithox 480 | | | | | | | | | |
| Glycerin | | | | | | | 20.0 | 20.0 | 20.0 |
| Diglycerin | 35.0 | | | | | | 15.0 | | |
| Ethylene glycol | | 35.0 | | | | | | 15.0 | |
| Propylene glycol | | | 35.0 | | | | | | 15.0 |
| Diethylene glycol | | | | 35.0 | | | | | |
| Polyethylene glycol (average molecular weight of 300) | | | | | 35.0 | | | | |
| Dipropylene glycol | | | | | | 35.0 | | | |
| Ejection performance | A | A | A | A | A | A | A | A | A |
| Density feeling (sublimation textile printing-dyeing) | A | A | A | A | A | A | A | A | A |
| Temporal ink stability | A | A | A | A | A | A | A | A | A |

TABLE 3

| Com. Ex. No. | 1 | 2 | 3 | 4 | 5 | 6 | 7 | 8 |
|---|---|---|---|---|---|---|---|---|
| C.I. Disperse Yellow-65 | | | | | | | | |
| C.I. Disperse Red-92 | 8.0 | 8.0 | 8.0 | 8.0 | 8.0 | 8.0 | 8.0 | 8.0 |
| C.I. Disperse Blue-60 | | | | | | | | |
| C.I. Disperse Blue-165 | | | | | | | | |
| Surfynol 82 | | | | | | 1.0 | 1.0 | 1.0 |
| Surfynol 104E | 1.0 | | | | | | | |
| Surfynol 465 | | 1.0 | | | | | | |
| BYK-348 | | | 1.0 | | | | | |
| Diethylene glycol monobutyl ether | | | | 1.0 | | | | |
| 1,2-Hexanediol | | | | | 1.0 | | | |
| Joncryl 63 (solid content) | 2.4 | 2.4 | 2.4 | 2.4 | 2.4 | | | |
| Joncryl 61 (solid content) | | | | | | | | |
| Joncryl 70 (solid content) | | | | | | | | |
| Joncryl 57 (solid content) | | | | | | 2.4 | | |
| Demol N | | | | | | | 8.0 | 5.6 |
| Demol SNB | | | | | | | | |
| Unithox 480 | | | | | | | | 2.4 |
| Glycerin | 35.0 | 35.0 | 35.0 | 35.0 | 35.0 | 35.0 | 35.0 | 35.0 |
| Diglycerin | | | | | | | | |
| Ethylene glycol | | | | | | | | |
| Propylene glycol | | | | | | | | |
| Diethylene glycol | | | | | | | | |
| Polyethylene glycol (average molecular weight of 300) | | | | | | | | |
| Dipropylene glycol | | | | | | | | |
| Ejection performance | A | A | A | A | A | A | A | A |
| Density feeling (textile printing-dyeing) | B | B | C | B | B | A | B | C |
| Temporal ink stability | C | C | B | C | B | B | B | A |

As is clear from these test results, with the inks of Working Examples 1 to 22 of the present invention, including "Joncryl 63" and "Surfynol 82", it was possible to achieve a stable recording performance, an ink storage stability, and a high print density on the surface of a dyed fabric. The inks of Comparative Examples 1 to 5 in which "Surfynol 104E", "Surfynol 465", "BYK-348", diethylene glycol monobutyl ether, and 1,2-hexanediol were used instead of "Surfynol 82" had a stable recording performance, but print density was low because the ink permeated the dyed fabric, and the ink storage stability was poor. The ink of Comparative Example 6 in which "Joncryl 57" with a low molecular weight was used instead of "Joncryl 63" had an insufficient ink storage stability. The ink of Comparative Example 7 in which "Demol N" was used instead of "Joncryl 63" permeated the dyed fabric, so that print density was low, and the ink storage stability was poor. The ink of Comparative Example 8 in which "Demol N" was used instead of "Joncryl 63" and "Unithox 480" was further added permeated the dyed fabric, so that print density was low.

INDUSTRIAL APPLICABILITY

With ink for inkjet textile printing of the present invention using a disperse dye as a color material component, it is possible to provide disperse dye-containing ink for inkjet textile printing that has a prerequisite high-quality and stable recording performance and achieves a high print density on the surface of a fabric while maintaining an ink storage stability, and an inkjet textile printing method using the ink for inkjet textile printing. Accordingly, the present invention is suitable for ink for inkjet textile printing using a disperse dye as a color material component, and for a dyeing method using the ink for inkjet textile printing.

The invention claimed is:

1. Ink for inkjet textile printing, comprising:
   water;
   a disperse dye;
   a water-soluble organic solvent; and
   an anionic high-molecular dispersant,
   wherein the water-soluble organic solvent is at least one selected from glycerin, diethylene glycol, triethylene glycol, polyethylene glycol (average molecular weight of 200 to 600), dipropylene glycol and tripropylene glycol,
   the water-soluble organic solvent is contained in an amount of 25 to 50 mass % with respect to a total mass of the ink,
   the anionic high-molecular dispersant is a styrene-(meth)acrylic acid-based copolymer having an acid value of 160 to 250 mg KOH/g and a weight-average molecular weight of 8,000 to 20,000, and is a dispersant for the disperse dye, and
   the ink for inkjet textile printing further contains an acetylene glycol-based compound expressed by the following Chemical Formula (I)

[Chemical Formula 1]

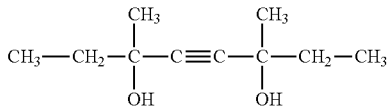

as a penetrant.

2. The ink for inkjet textile printing according to claim 1, wherein the dispersant has a weight-average molecular weight of 10,000 to 18,000.

3. The ink for inkjet textile printing according to claim 1, wherein the styrene-(meth)acrylic acid-based copolymer is contained in an amount of 0.2 to 4 mass % with respect to the total mass of the ink.

4. The ink for inkjet textile printing according to claim 1, wherein the acetylene glycol-based compound is contained in an amount of 0.1 to 2.0 mass % with respect to the total mass of the ink.

5. The ink for inkjet textile printing according to claim 1, further comprising an anionic surfactant in an amount of 0.1 to 3 mass % with respect to the total mass of the ink.

6. The ink for inkjet textile printing according to claim 1, wherein the water-soluble organic solvent is at least one selected from glycerin, diethylene glycol, and dipropylene glycol.

7. The ink for inkjet textile printing according to claim 6, wherein the water-soluble organic solvent is glycerin.

8. An inkjet textile printing method which performs inkjet printing using ink for inkjet textile printing on a fabric made of a hydrophobic fiber material and then heats the fabric,
   the ink for inkjet textile printing comprising water, a disperse dye, a water-soluble organic solvent, and an anionic high-molecular dispersant,
   the water-soluble organic solvent being at least one selected from glycerin, diethylene glycol, triethylene glycol, polyethylene glycol (average molecular weight of 200 to 600), dipropylene glycol and tripropylene glycol,
   the water-soluble organic solvent being contained in an amount of 25 to 50 mass % with respect to a total mass of the ink,
   the anionic high-molecular dispersant being a styrene-(meth)acrylic acid-based copolymer having an acid value of 160 to 250 mg KOH/g and a weight-average molecular weight of 8,000 to 20,000, and is a dispersant for the disperse dye, and
   the ink for inkjet textile printing further comprising an acetylene glycol-based compound expressed by the following Chemical Formula (I)

[Chemical Formula 1]

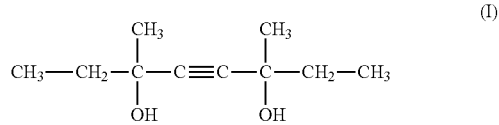

as a penetrant.

9. The inkjet textile printing method according to claim 8, wherein a temperature during the heating is within a range of 150 to 220° C. and a heating time is 1 to 15 minutes.

10. The inkjet textile printing method according to claim 8, wherein the dispersant has a weight-average molecular weight of 10,000 to 18,000.

11. The inkjet textile printing method according to claim 8, wherein the styrene-(meth)acrylic acid-based copolymer is contained in an amount of 0.2 to 4 mass % with respect to the total mass of the ink.

12. The inkjet textile printing method according to claim 8, wherein the acetylene glycol-based compound is contained in an amount of 0.1 to 2.0 mass % with respect to the total mass of the ink.

13. The inkjet textile printing method according to claim 8, wherein the ink further contains an anionic surfactant in an amount of 0.1 to 3 mass % with respect to the total mass of the ink.

14. The inkjet textile printing method according to claim 8, wherein the water-soluble organic solvent is at least one selected from glycerin, diethylene glycol, and dipropylene glycol.

15. The ink for inkjet textile printing according to claim 14, wherein the water-soluble organic solvent is glycerin.

* * * * *